(12) United States Patent
Galeotti

(10) Patent No.: US 10,704,592 B2
(45) Date of Patent: Jul. 7, 2020

(54) HINGE SYSTEM FOR AIRFOIL

(71) Applicant: Giovanni Galeotti, Wilrijk (BE)

(72) Inventor: Giovanni Galeotti, Wilrijk (BE)

(\*) Notice: Subject to any disclaimer, the term of this patent is extended or adjusted under 35 U.S.C. 154(b) by 362 days.

(21) Appl. No.: 15/656,688

(22) Filed: Jul. 21, 2017

(65) Prior Publication Data
US 2018/0023618 A1  Jan. 25, 2018

(30) Foreign Application Priority Data

Jul. 22, 2016 (EP) .................................... 16180804

(51) Int. Cl.
| | |
|---|---|
| *F16C 11/12* | (2006.01) |
| *B63B 1/24* | (2020.01) |
| *B64C 3/48* | (2006.01) |
| *B64C 9/02* | (2006.01) |
| *B64C 9/16* | (2006.01) |
| *B64C 9/22* | (2006.01) |
| *B63B 1/28* | (2006.01) |
| *B64C 9/00* | (2006.01) |

(52) U.S. Cl.
CPC .............. *F16C 11/12* (2013.01); *B63B 1/248* (2013.01); *B64C 3/48* (2013.01); *B64C 9/02* (2013.01); *B64C 9/16* (2013.01); *B64C 9/22* (2013.01); *B63B 1/242* (2013.01); *B63B 1/28* (2013.01); *B64C 2009/005* (2013.01)

(58) Field of Classification Search
CPC ... F16C 11/12; B64C 9/22; B64C 9/16; B64C 9/02; B64C 2009/005; B64C 3/48; B63B 1/28; B63B 1/242; B63B 1/248
See application file for complete search history.

(56) References Cited

U.S. PATENT DOCUMENTS

| | | | | |
|---|---|---|---|---|
| 4,427,169 A | * | 1/1984 | Brown ..................... | B64C 7/00 244/129.1 |
| 5,114,104 A | * | 5/1992 | Cincotta .................. | B64C 3/48 244/219 |
| 5,367,970 A | * | 11/1994 | Beauchamp ............ | B63B 1/248 114/140 |
| 5,662,294 A | | 9/1997 | Maclean et al. | |
| 5,839,700 A | * | 11/1998 | Nedderman, Jr. ........ | B64C 3/48 244/219 |

(Continued)

FOREIGN PATENT DOCUMENTS

| | | |
|---|---|---|
| DE | 103 37 918 A1 | 2/2004 |
| FR | 549141 | 2/1923 |
| RU | 2 167 785 C2 | 5/1999 |

OTHER PUBLICATIONS

European Search Report dated Feb. 1, 2017 issued in EP Application No. 16180804.3, filed Jul. 22, 2016.

*Primary Examiner* — Assres H Woldemaryam

(74) *Attorney, Agent, or Firm* — Workman Nydegger

(57) ABSTRACT

A foil hinge system for a hydrofoil or airfoil includes a main foil body 1, substantially extending in a longitudinal direction L and a transverse direction T, a flap 2 hinged to the main foil body 1 arranged on a longitudinal end side of the main foil body 1, and a flexible element 3 connecting the main foil body 1 and the flap 2. Several rigid structures 4, 5 are arranged in such a manner on the flexible element 3, that they provide a dead stop when the flap 2 is in a maximum deflection with respect to the main foil body 1.

17 Claims, 2 Drawing Sheets

(56) References Cited

U.S. PATENT DOCUMENTS

| | | | | |
|---|---|---|---|---|
| 5,887,828 A * | 3/1999 | Appa | ............. | B64C 3/48 |
| | | | | 244/215 |
| 6,182,929 B1 * | 2/2001 | Martin | ............. | B63B 1/248 |
| | | | | 244/219 |
| 6,835,108 B1 | 12/2004 | Gieseke | | |
| 7,699,270 B2 * | 4/2010 | Lonsinger | ............. | B64C 3/185 |
| | | | | 244/219 |
| 8,382,045 B2 * | 2/2013 | Manley | ............. | B64C 9/16 |
| | | | | 244/213 |
| 8,418,967 B2 * | 4/2013 | Hemmelgarn | ............. | B64C 3/48 |
| | | | | 244/219 |
| 8,434,293 B2 * | 5/2013 | Widdle, Jr. | ............. | F02K 1/10 |
| | | | | 60/264 |
| 8,657,561 B2 * | 2/2014 | Buffone | ............. | B64C 3/48 |
| | | | | 415/12 |
| 9,145,198 B1 * | 9/2015 | Shome | ............. | B64C 3/48 |
| 9,457,887 B2 * | 10/2016 | Roe | ............. | B64C 3/54 |
| 9,745,048 B2 * | 8/2017 | Wood | ............. | B64C 3/44 |
| 9,944,356 B1 * | 4/2018 | Wigley | ............. | B63B 3/38 |
| 2012/0018589 A1 * | 1/2012 | Testi | ............. | A63H 27/001 |
| | | | | 244/35 R |
| 2013/0020444 A1 * | 1/2013 | Balzer | ............. | B64C 9/16 |
| | | | | 244/215 |
| 2017/0217586 A1 * | 8/2017 | Goelet | ............. | A01G 15/00 |
| 2018/0162515 A1 * | 6/2018 | Brewer | ............. | B64C 3/50 |

* cited by examiner

HINGE SYSTEM FOR AIRFOIL

CROSS-REFERENCE TO RELATED APPLICATIONS

This application claims priority to European Application No. 16 180 804.3, filed Jul. 22, 2016, which is incorporated herein by specific reference.

BACKGROUND OF THE INVENTION

1. The Field of the Invention

The present invention relates to a foil hinge system for a hydrofoil or airfoil, comprising a main foil body, substantially extending in a longitudinal and a transverse direction, a flap hinged to the main foil body arranged on a longitudinal end side of the main foil body, and a flexible element connecting the main foil body and the flap.

2. The Relevant Technology

U.S. Pat. No. 6,835,108 B1 discloses a propulsion system with an oscillating appendage, which can be moved into opposingly flexed positions.

Flexible control surfaces are known from U.S. Pat. No. 5,662,294 A and RU 2 167 785 C2.

SUMMARY OF THE INVENTION

The present invention has the object of providing a reliable and beneficial foil hinge system.

The invention provides a foil hinge system for a hydrofoil or airfoil, comprising a main foil body, substantially extending in a longitudinal and a transverse direction, a flap hinged to the main foil body arranged on a longitudinal end side of the main foil body, and a flexible element connecting the main foil body and the flap, wherein several rigid structures are arranged in such a manner on the flexible element that they provide a dead stop when the flap is in a maximum deflection with respect to the main foil body.

An accordingly improved foil hinge system enables the articulation of the flap by means of the flexible element with respect to the main foil body, so as to change the section shape of the foil.

The improved foil hinge system is constructed in a way that allows the outer surface of the foil, flexible element and flap to remain continuous, smooth and without the presence of hinge lines or cuts, which could disturb the flow causing undesirable effects of loss of lift and increased drag.

In particular, the maximum curvature and deflection of the flexible element can be specified by the design and distribution of the several rigid structures. In particular, the distance between and shape of the individual rigid structures can be varied along the longitudinal and/or transverse extension of the flexible element. Thus, the degree and shape of the maximum deflection of the flexible element can be controlled through the design of the system. Also, the necessary forces needed to displace the flap with respect to the main foil body from the neutral position can be defined by the design of the flexible element.

Thus, the foil hinge system can be designed so as to allow well defined passive aero elastic or hydro elastic deformation. The amount of deformation at a given load is specified by the design. Also, the foil hinge system allows precisely moving an actively controlled flap.

The arrangement of rigid structures on the flexible element enables to damp flutter and other unwanted vibrations, in particular through contact forces between the rigid structures and preferably through the use of appropriate energy absorbing materials, either for the rigid structures or between same. While the foil hinge system is enabled by a simple and robust construction, it enables small scale and high load applications.

In a preferred embodiment, the rigid structures are shaped and arranged on the flexible element such that a gap is provided between the adjacent rigid structures, which gap enables movement of the flap relative to the main foil body. Thus, while the rigid structures are not in contact, the flexible element may move, while when the rigid structures come into contact, a local restriction of the movement of the flexible element is enabled. When all rigid structures come into contact with their respective neighbours or are moved as close as possible to their respective neighbours, the flexible element and flap are in their dead stop position.

According to an embodiment of the invention, the rigid structures substantially extend in the transversal direction and the gap is provided in the longitudinal direction. Thus, the flap can be hinged substantially around several discrete axes in the transverse direction, such that a desired curvature of the flexible element in the longitudinal direction is established.

Preferably, the flexible element substantially extends in a longitudinal and a transverse direction and connects the main foil body and the flap in the longitudinal direction, wherein the rigid structures are provided in a spanwise direction on both sides of the flexible element. In particular, the spanwise direction corresponds to the transverse direction. Providing rigid structures on both sides of the flexible element enables a dead stop in both directions of the flap movement.

In particular, the flexible element is made of a thin flexible composite sheet. More particularly, the flexible element is made of a thin flexible laminated composite sheet. Thus, the flexible element provides a high stability. By means of the inventive several rigid structures, it can be prevented that the flexible element is bent into a too high curvature, where the composite sheet may be damaged, in particular delaminated. Thus, the combination of the several rigid structures and the composite sheet material for the flexible element is particularly beneficial.

In one embodiment, the flexible element is made of an anisotropic material. Thus, the distribution of stiffness can be well adjusted to requirements regarding the bending direction and applied stress.

Preferably, the flexible element is made of a composite sheet material whose fiber direction, orientation and laminate thickness is altered locally. The thickness may be locally increased and/or the orientation of fibers may be provided in accordance with the requirements of the flexibility of the element.

In a preferred embodiment of the invention, at least three rigid structures are arranged on the flexible element, in particular on each side of flexible element. Thus, a desired minimum curvature of the flexible element is ensured while enabling a certain desired movement of the flap. Generally, the more rigid structures are arranged on the flexible element, the higher the maximum deflection of the flap with respect to the main foil body, while ensuring the same maximum curvature of the flexible element. In some embodiments, there may be less than 10, in other embodiments less then 5 rigid structures on each side of the flexible element.

In some embodiments, the rigid structures have a wedge-like form increasing their longitudinal width in the spanwise direction towards the flexible element, wherein when the flap is in its central position, the adjacent surfaces of two adjacent rigid structures are arranged in an angle ($\alpha$) to each other. The central position of the flap is generally the position where the flexible element is substantially arranged in a plane. The angle $\alpha$ in the rigid structures determines the maximum curvature that can be obtained by the flexible element in the region of the respective rigid structures. In particular, the adjacent surfaces of the rigid structures may be flat and may be in surface contact with each other when the flap is fully moved in the respective direction, i.e., when the flexible element has its maximum curvature.

Preferably, an elastic cover is provided between the main foil body and the flap and covers the rigid structures. This enables a flat outer surface of the foil hinge system, which improves the flow characteristics of the foil hinge system when used in a hydrofoil or airfoil. Furthermore, this enables that the foil hinge system is sealed and well suited to work in a corrosive marine environment.

Preferably, the elastic cover comprises a boundary elastomer, which is directly arranged on the rigid structure, and an outside elastomer, which is arranged on the boundary elastomer. The boundary elastomer provides desired elastic properties to the foil hinge system, while the outside elastomer mainly serves to provide a durable and continuous outside surface.

In some embodiments, the elastic cover provides a continuous surface between the flap and the main foil body. This applies not only in the central position of the flap, but also for the maximum deflected flaps. For this purpose, the elastic cover has a sufficient elasticity such that wrinkles can be avoided even during the maximum deflection. This is in particular possible as highly elastic material can be chosen for the elastic cover, which differs from the material of the flexible element and also from the material of the optionally provided boundary elastomer. The continuous surface improves the flow properties.

Preferably, chamfers are provided at the longitudinal end sides of the main foil body and/or the flap, which are adjacent to the flexible element. This enables that sufficient space for the deformation of the elastic cover during the deflection of the flap is provided. Furthermore, this enables a better connection, in particular by adhesive, between the elastic cover and the longitudinal end sides of the main foil body and/or the flap, as the interface surface is increased.

In particular, the rigid structures are adapted to come into contact with their respective adjacent rigid structure when the flap is in a maximum deflection.

Thus, in some embodiments of the invention, the gaps are void without any material between the several rigid structures. However, in other embodiments, it is also possible to provide soft material or liquid in the gaps to enable desired damping or elastic properties.

The invention further provides an airfoil or a hydrofoil comprising a foil hinge as specified above, wherein the flap is in particular a leading edge flap, a trailing edge flap, an aileron or a trim tab.

Furthermore, the invention is directed to a watercraft comprising such a hydrofoil. In particular, the hydrofoil may be an actively controlled part, whereas in other applications, it may only passively move.

The inventive foil hinge system may be placed just about anywhere along the longitudinal section of a foil, which allows to change the foil shape, such that a desired change in lift and drag characteristics of the foil can be obtained.

The position of the foil hinge system may also change the pitching moment or torque of the foil. By changing the shape of the foil, same can therefore be optimized for a given operating condition. Lift can be increased when necessary to carry greater loads. Drag can be minimized to increase speed or fuel efficiency or drag can be increased for the purpose of decelerating the craft. Lift can be altered on control surfaces to alter the attitude or direction of the craft.

The invention can be applied to foils of various types, rudders, keels, hydrofoils of different configuration including T foils and J foils, DSS (Dynamic Stability System) foils, wings, and any conceivable foil operating in a fluid where a change in the shape of the foil brings about a change in its operating characteristics, lift and drag being of pre-eminent importance.

BRIEF DESCRIPTION OF THE DRAWINGS

The invention will now be further explained with reference to an exemplary embodiment as shown in the figures.

DETAILED DESCRIPTION OF THE PREFERRED EMBODIMENTS

Figure 1:
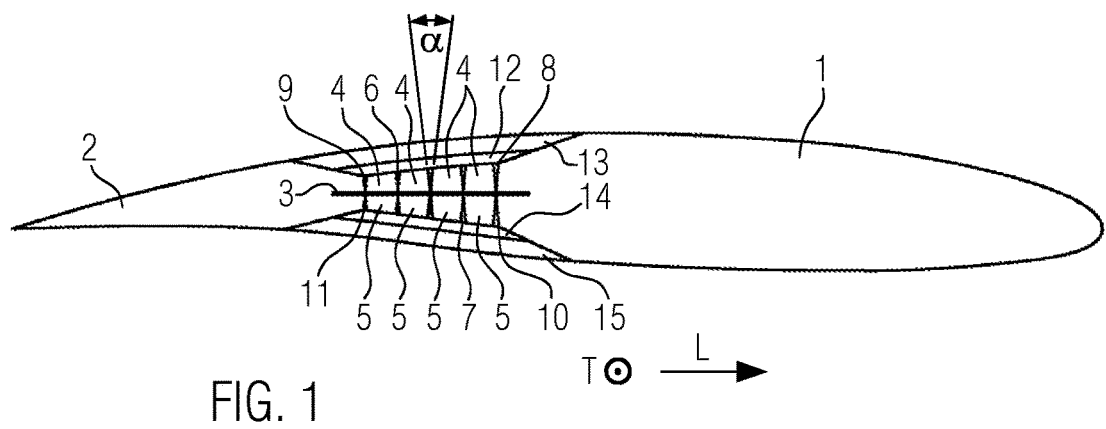
FIG. 1 shows a sectional side view of an embodiment of a foil hinge system according to the invention.
Figure 2:
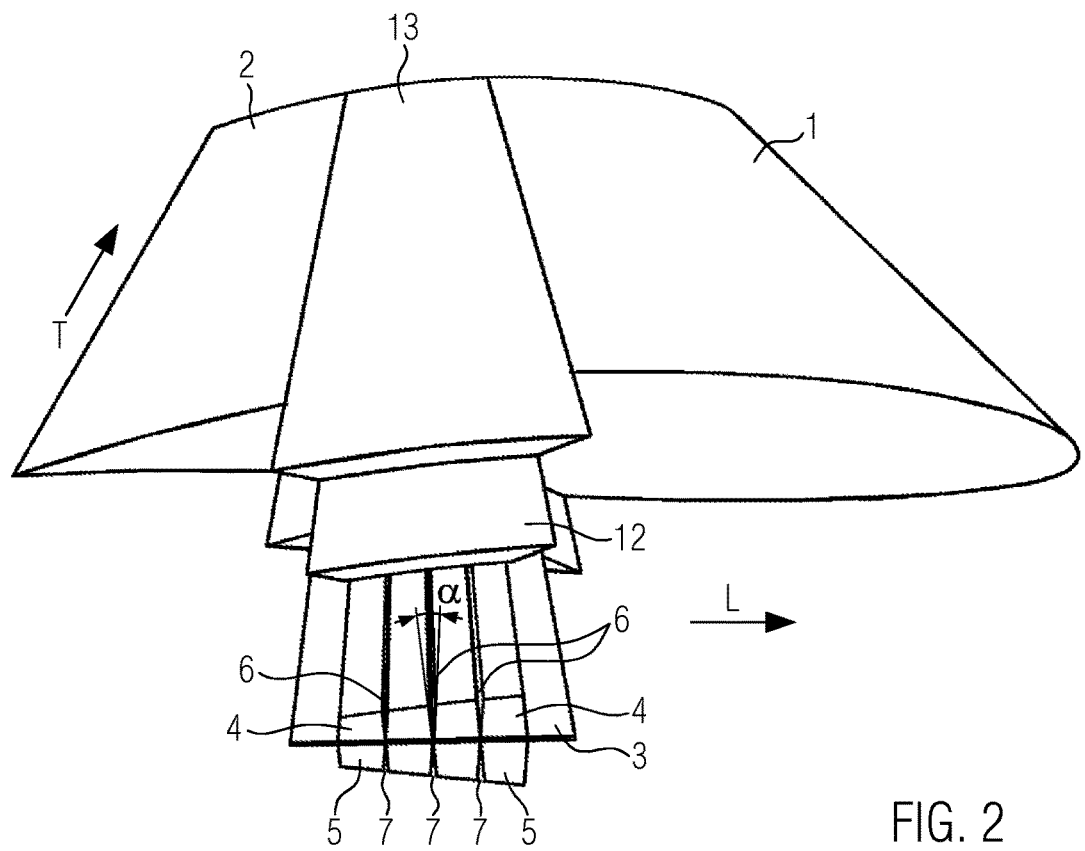
FIG. 2 shows a perspective sectional view of the embodiment according to FIG. 1.

FIG. 1 shows a foil hinge system according to an embodiment of the invention. The foil hinge system may be used in a hydrofoil or an airfoil with a streamline shape as shown in FIG. 1. However, in other embodiments, the foil hinge system may also be used in air foils or hydrofoils of other types, for example, for foils that comprise a leading edge flap, a trailing edge flap, an aileron or trim tab.

The foil hinge system comprises a main foil body 1 substantially extending in a longitudinal direction L and transverse direction T. The main foil body 1 has a thickness perpendicular to the transverse and longitudinal direction, which is smaller than the extension of the main foil body in the longitudinal and transverse directions.

The flexible element 3 is inserted in a groove in the longitudinal end side of the main foil body. Also, the flexible element 3 is inserted in a groove in the longitudinal end side of the flap. The flexible element 3 may be fixed by adhesive and/or mechanical fasteners in the respective grooves. In other embodiments, the flexible element may be laminated as an integral part of either the flap or the main foil body. Further alternatively, the main foil body, flexible element and flap may all be laminated as one piece.

The foil hinge system further comprises a flap 2, which is movable with respect to the main foil body 1. For this purpose, the foil hinge system comprises a flexible element 3 connecting the main foil body 1 and the flap 2. The flexible element 3 is adapted to be bent substantially around the transverse direction T as shown for different articulation states in FIG. 3, such that the flap 2 can be brought into different articulations regarding the main foil body 1. This in particular serves the purpose that the flow of air or water around the foil hinge system may be actively controlled, or that the foil hinge system may passively adapt to external flow conditions.

In particular, the flexible element 3 is made of a thin flexible laminate composite sheet (LCS) connecting the main foil body 1 and the flap 2. This sheet may have a locally or a directionally different stiffness in order to provide the desired curvature when being bent. The desired distribution of stiffness can be effected by using anisotropic material such as carbon fiber and altering the fiber orientation and/or laminate thickness within the flexible element 3.

Several rigid structures 4 are provided on one side of the flexible element 3, and several rigid structures 5 are provided on the other side of the flexible element 3. In particular, the several rigid structures 4, 5 are spanwise rigid structures (SRS) that are laminated in a spanwise direction to the top and bottom of the flexible element 3, which is formed as a flexible composite sheet.

The several rigid structures 4, 5 are shaped in a manner that gaps 6, 7 are provided between them when the flexible element 3 is in an unarticulated position. These gaps 6, 7 serve the purpose of stabilizing the foil hinge system and limiting the curvature of the flexible element 3 in the maximum articulation of the flap 2, as shown in FIGS. 3a and 3g.

In addition to the gaps 6, 7 between the rigid structures 4, 5, gaps 8, 9, 10, 11 may be provided between the respective outer rigid structure and the adjacent main foil body 1 or flap 2. The gaps 6, 7, 8, 9, 10, 11 define several discrete hinge lines in the flexible element 3 along which bending is possible. Thus, they enable a defined movability of the flexible element 3. This enables that defining and ensuring the maximum allowed bend of the flexible element 3, and a well defined movement of the flexible element 3 and the flap 2 according to required properties in between the maxima.

The according angles $\alpha$ are also provided between the main foil body 1 and the adjacent rigid structures 4, 5 and the flap 2 and the adjacent rigid structures 4, 5 in the respective gaps 8, 9, 10, 11. In particular, the side walls of each of the gaps 6, 7, 8, 9, 10, 11 define a respective angle $\alpha$, which may be different for each gap. The angle $\alpha$ defines the maximum bending at the hinge line defined by the respective gap 6, 7, 8, 9, 10, 11. The addition of all angles $\alpha$ at one side of the flexible element defines the maximum articulation of the flap 2.

On the rigid structures 4, 5 and between the main foil body 1 and the flap 2, a boundary elastomer 12, 14 is provided. On the boundary elastomer 12, 14, an outside elastomer 13, 15 is provided, which enables a continuous and smooth surface between the main foil body 1 and the flap 2. In particular, the outside elastomer 13, 15 is flush with the surface of the main foil body 1 and the flap 2. The boundary elastomer 12, 14 and the outside elastomer 13, 15 form together an elastic cover on each side of the foil hinge system. In other embodiments, providing one elastomer layer only for the elastic cover on each side of the flexible element 3 is sufficient. However, the different layers for the outside elastomer 13, 15 and the boundary elastomer 12, 14 enable to use different materials or materials with different characteristics. For example, it may be possible to choose a more soft material for the boundary elastomer 12, 14, while providing a thinner but more resilient material for the outside elastomer 13, 15. The material of the outside elastomer 13, 15 has to withstand the environment, e.g. should not be negatively affected by seawater or UV light. A uniform surface finish can be applied over the entire foil hinge system including the region of the flexible element and thus a smooth continuous surface can be attained. Thus, the foil hinge system has a continuous and uniform surface with the foil and main foil body.

Furthermore, the properties of the elastic cover, in particular the properties of the boundary elastomer 12, 14 and outside elastomer 13, 15 may be varied so as to precisely determine the static and dynamic behaviour of the articulated foil surfaces.

Figure 3:
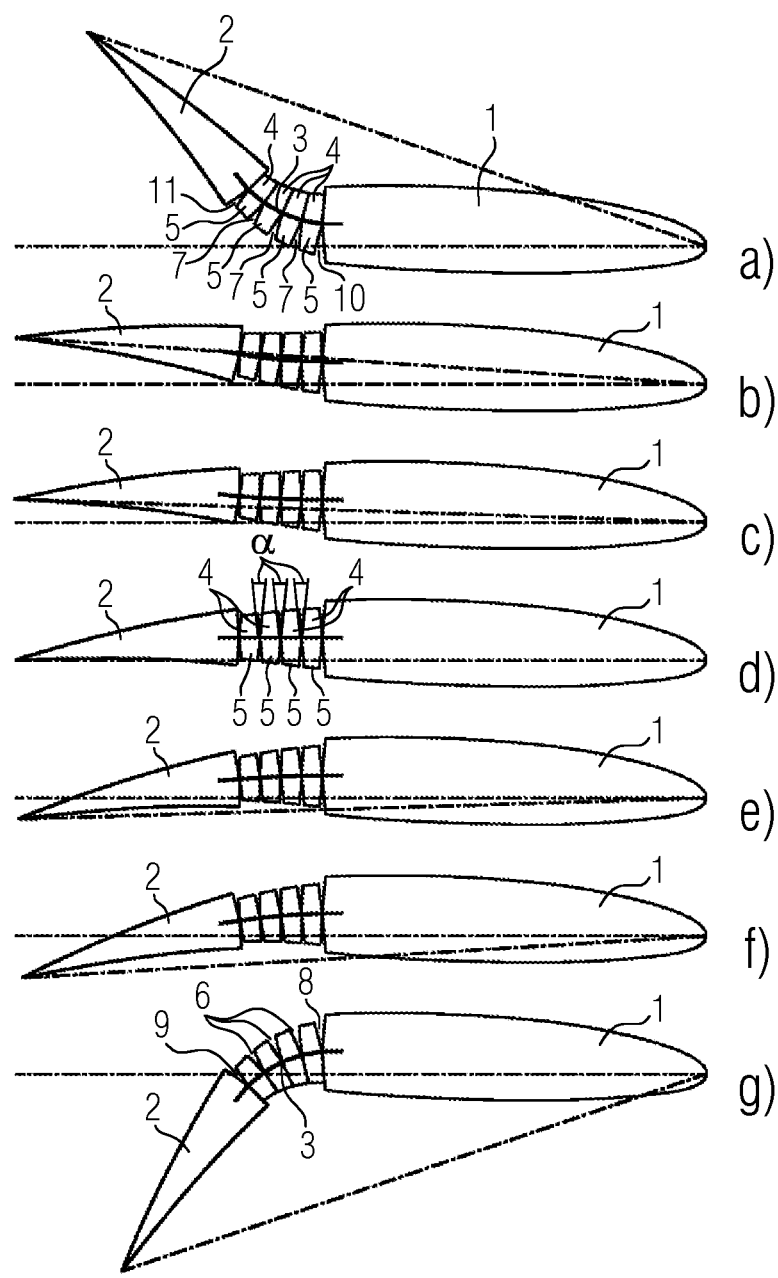
FIG. 3 shows different deflection states of the flexible element and flap of the foil hinge system according to FIG. 1 in a sectional view.

In FIG. 3, several articulations of the flap with respect to the main foil body 1 are shown. FIG. 3d shows the central unarticulated position of the flap 2 with the flexible element 3 being straight. FIG. 3a shows a maximum articulation of the flap 2 towards the top. As can be seen in FIG. 3a, all the upper gaps 6 between the rigid structures 4 and the gaps 8, 9 between the outer rigid structures and the main foil body 1 and respectively the flap 2 are closed, and in particular the side surfaces of the rigid structures 4 are in surface contact with each other.

Thus, the several rigid structures provide a dead stop for the flap and prevent further upward movement. The same situation is shown for the maximum deflection of the flap 2 in the lower direction in FIG. 3g.

FIGS. 3c and 3b show an increasing articulation of the flap 2 with respect to the main foil body 1 toward the state as shown in FIG. 3a. FIGS. 3e and 3f show an increasing articulation of the flap 2 with respect to the main foil body 1 toward the state as shown in FIG. 3g.

It is emphasized that the angles $\alpha$ for each of the gaps 6, 7, 8, 9, 10 or 11 may be different and chosen as required by a particularly required static and dynamic behaviour of the foil hinge system. In some embodiments all angles $\alpha$ for the upper gaps 6, 8, 9 may be the same and/or all angles $\alpha$ for the lower gaps 7, 10, 11 may be the same. In some embodiments all angles $\alpha$ of all gaps 6, 7, 8, 9, 10 or 11 may be the same.

While in the present embodiment the foil hinge system was shown to comprise an entire main foil body and flap, the foil hinge system may also be provided as a system that is connected to a foil and flap, by essentially only providing the hinge and connector parts for the foil and flap.

In the present embodiment, the several rigid structures are arranged such that, at the flexible element 3, they are substantially in contact with each other. This enables clearly specified discrete hinge lines on the flexible element 3. However, in other embodiments, it is also possible that a certain distance is provided between the rigid structures on the flexible element, allowing discrete portions of the flexible element 3 in between the rigid structures to be freely curved.

What is claimed is:

1. A foil hinge system for a hydrofoil or airfoil, comprising:
    a main foil body, substantially extending in a longitudinal direction and a transverse direction,
    a flap hinged to the main foil body arranged on a longitudinal end side of the main foil body, and
    a flexible element connecting the main foil body and the flap,
    wherein several rigid structures are arranged in such a manner on the flexible element, that the rigid structures provide a dead stop when the flap is in a maximum deflection with respect to the main foil body.

2. The foil hinge system according to claim 1, wherein the rigid structures are shaped and arranged on the flexible element such that a gap is provided between the adjacent rigid structures, which enables movement of the flap relative to the main foil body.

3. The foil hinge system according to claim 2, wherein the rigid structures substantially extend in the transversal direction and the gap is provided in the longitudinal direction.

4. The foil hinge system according to claim 1, wherein the flexible element substantially extends in a longitudinal direction and transverse direction and connects the main foil body and flap in the longitudinal direction, wherein the rigid structures are provided in a spanwise direction on both sides of the flexible element.

5. The foil hinge system according to claim 1, wherein the flexible element is made of a thin flexible composite sheet.

6. The foil hinge system according to claim 1, wherein the flexible element is made of an anisotropic material.

7. The foil hinge system according to claim 1, wherein flexible element is made of a composite sheet material, whose fiber direction orientation and/or laminate thickness is altered locally.

8. The foil hinge system according to claim 1, wherein at least three rigid structures are arranged on the flexible element.

9. The foil hinge system according to claim 1, wherein the rigid structures have a wedge-like form increasing the longitudinal width of the rigid structures in the spanwise direction towards the flexible element, wherein when the flap is in a central position, the adjacent surfaces of two adjacent rigid structures are arranged in an angle (a) to each other.

10. The foil hinge system according to claim 1, wherein an elastic cover is provided between the main foil body and flap and covers the rigid structures.

11. The foil hinge system according to claim 10, wherein the elastic cover comprises a boundary elastomer which is directly arranged on the rigid structure and an outside elastomer which is arranged on the boundary elastomer.

12. The foil hinge system according to claim 10, wherein the elastic cover provides a continuous surface between the flap and main foil body.

13. The foil hinge system according to claim 1, wherein chamfers are provided at the longitudinal end sides of the main foil body and/or flap, which are adjacent to the flexible element.

14. The foil hinge system according to claim 1, wherein the rigid structures are adapted to come into contact with respective adjacent rigid structures when the flap is in a maximum deflection regarding the main foil body.

15. An airfoil or Hydrofoil comprising a foil hinge according to claim 1, wherein the flap is a leading edge flap, trailing edge flap, aileron or trim tab.

16. The foil hinge system according to claim 1, wherein a plurality of the several rigid structures are disposed on a first side of the flexible element and a plurality of the several rigid structures are disposed on a second side of the flexible element that is opposing the first side.

17. The foil hinge system according to claim 1, wherein each of the several rigid structures has an elongated length that extends in the transverse direction, a width that extends in the longitudinal direction, and a height that extends normal to the transverse direction and the longitudinal direction, the length of each of the several rigid structures being greater than the width or the height.

* * * * *